United States Patent
Gilstring

(10) Patent No.: US 9,301,439 B2
(45) Date of Patent: Apr. 5, 2016

(54) AGRICULTURAL IMPLEMENT AND METHOD OF CONTROLLING AN AGRICULTURAL IMPLEMENT

(75) Inventor: Gert Gilstring, Skanninge (SE)

(73) Assignee: VÄDERSTAD HOLDING AB, Väderstad (SE)

( * ) Notice: Subject to any disclaimer, the term of this patent is extended or adjusted under 35 U.S.C. 154(b) by 162 days.

(21) Appl. No.: 14/005,136

(22) PCT Filed: Mar. 9, 2012

(86) PCT No.: PCT/SE2012/050269
§ 371 (c)(1),
(2), (4) Date: Nov. 18, 2013

(87) PCT Pub. No.: WO2012/125109
PCT Pub. Date: Sep. 20, 2012

(65) Prior Publication Data
US 2014/0060862 A1    Mar. 6, 2014

(30) Foreign Application Priority Data
Mar. 14, 2011 (SE) .................................. 1150222

(51) Int. Cl.
*A01B 63/114* (2006.01)
*A01B 49/02* (2006.01)
*A01B 63/22* (2006.01)
*F15B 15/28* (2006.01)

(52) U.S. Cl.
CPC ............. *A01B 63/114* (2013.01); *A01B 49/027* (2013.01); *A01B 63/22* (2013.01); *F15B 15/28* (2013.01)

(58) Field of Classification Search
USPC ............................................................ 172/4
IPC ........................ A01B 63/22,63/114; F16F 15/28
See application file for complete search history.

(56) References Cited

U.S. PATENT DOCUMENTS

| 3,486,761 A | 12/1969 | Fay |
| 3,663,032 A | 5/1972 | Hook et al. |
| 4,106,568 A * | 8/1978 | Cline ............................ 172/327 |
| 4,107,859 A * | 8/1978 | Keith ............................ 37/413 |

(Continued)

OTHER PUBLICATIONS

Extended European Search Report issued Nov. 24, 2014 in Patent Application No. 12758024.9.

(Continued)

*Primary Examiner* — Gary Hartmann
(74) *Attorney, Agent, or Firm* — Oblon, McClelland, Maier & Neustadt, L.L.P.

(57) ABSTRACT

An agricultural implement, for working soil across which the agricultural implement travels or is towed, includes a frame, a first depth maintaining unit, including a first hydraulic actuator for adjusting height of the first depth maintaining unit relative to the frame, a second depth maintaining unit, including a second hydraulic actuator for adjusting height of the second depth maintaining unit relative to the frame, at least one soil working tool, and a hydraulic system including the hydraulic actuators configured to be connected to a mechanism supplying hydraulic fluid to the hydraulic system. A first side of the first hydraulic actuator communicates with a first side of the second hydraulic actuator and a measuring mechanism configured to provide a measured value corresponding to a first amount of hydraulic fluid occurring on said first sides.

14 Claims, 5 Drawing Sheets

(56) References Cited

U.S. PATENT DOCUMENTS

| | | | |
|---|---|---|---|
| 4,379,491 A | 4/1983 | Riewerts et al. | |
| 4,427,207 A | 1/1984 | Gafford | |
| 4,506,898 A | 3/1985 | Herron | |
| 4,535,849 A * | 8/1985 | Dietrich, Sr. | 172/468 |
| 4,660,842 A * | 4/1987 | Watt et al. | 280/43.23 |
| 4,821,806 A | 4/1989 | Winter | |
| 4,927,165 A | 5/1990 | Murray | |
| 4,967,851 A | 11/1990 | Barber | |
| 5,086,847 A * | 2/1992 | Meiners | 172/466 |
| 6,035,943 A | 3/2000 | Gerein et al. | |
| 6,092,816 A * | 7/2000 | Sekine et al. | 280/6.159 |
| 6,112,827 A | 9/2000 | Reiber et al. | |
| 6,131,669 A | 10/2000 | Friggstad et al. | |
| 6,164,385 A * | 12/2000 | Buchl | 172/239 |
| 6,167,972 B1 | 1/2001 | Hundeby et al. | |
| 6,189,465 B1 | 2/2001 | Burns et al. | |
| 6,192,994 B1 | 2/2001 | Friggstad et al. | |
| 6,202,756 B1 | 3/2001 | Hundeby et al. | |
| 6,206,106 B1 * | 3/2001 | Heckendorf | 172/799.5 |
| 6,293,352 B1 | 9/2001 | Hundeby et al. | |
| 6,305,478 B1 | 10/2001 | Friggstad | |
| 6,786,130 B2 | 9/2004 | Steinlage et al. | |
| 6,813,873 B2 * | 11/2004 | Allworden et al. | 56/10.2 E |
| 7,044,482 B2 * | 5/2006 | Shore | 280/6.157 |
| 7,063,167 B1 * | 6/2006 | Staszak et al. | 172/328 |
| 7,226,064 B2 * | 6/2007 | Shore | 280/124.159 |
| 8,235,130 B2 * | 8/2012 | Henry et al. | 172/4 |

OTHER PUBLICATIONS

International Search Report Issued Jun. 12, 2012 in PCT/SE12/050269 Filed Mar. 9, 2012.

\* cited by examiner

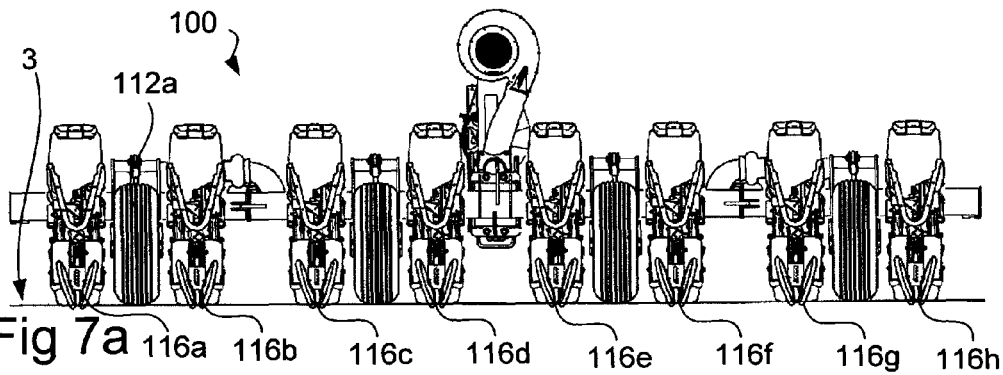
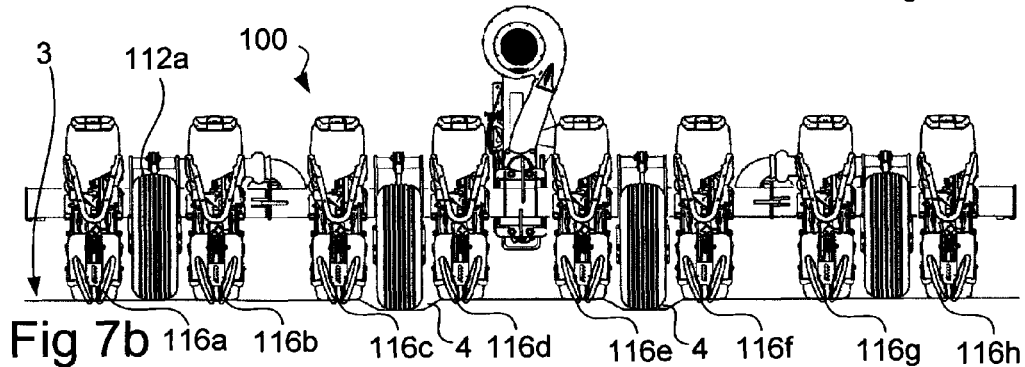
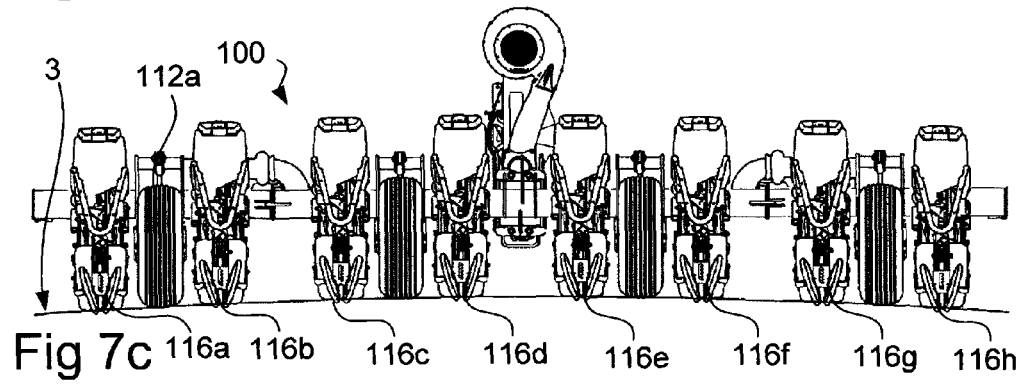
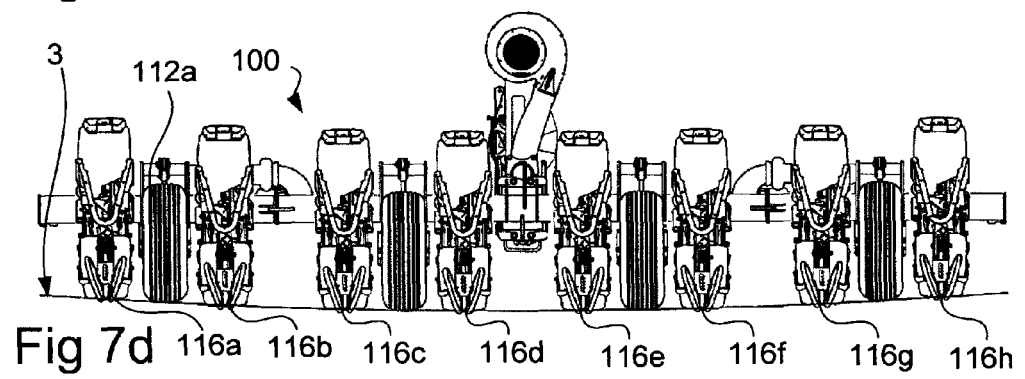

AGRICULTURAL IMPLEMENT AND METHOD OF CONTROLLING AN AGRICULTURAL IMPLEMENT

TECHNICAL FIELD

The present document relates to soil-working agricultural implements and more specifically to agricultural implements where it is desirable to maintain an even working depth.

BACKGROUND ART

Prior art includes a plurality of soil-working agricultural implements, whose working depth can be adjusted by means of hydraulic cylinders, which act between the frame of the agricultural implement and a support, such as a wheel or a packer roller.

A first type of soil-working agricultural implement is a so-called cultivator, which can be designed to be towed behind a towing vehicle, such as a tractor, and which can have a front wheel pair, followed by a plurality of rows of cultivating teeth or tines as well as, at the rear, a packer roller, or vice versa. Between on the one hand the frame and, on the other hand, the wheel pair and the packer roller, respectively, hydraulic cylinders are provided whose function is to set a distance between the respective frame portion and the ground, thereby controlling the working depth of the cultivating tines.

To provide a simple hydraulic system for such an agricultural implement, the hydraulic cylinders that control the packer roller and the hydraulic cylinders that control the wheel pair can be connected in parallel. By using hydraulic cylinders of different length of stroke and levers of different length, it is possible to obtain an agricultural implement, where the hydraulic cylinders of the packer roller and the wheel pair are connected in parallel and supplied via the same line, but where for example the packer roller is pulled up further than the wheel pair, such that the agricultural implement comes to rest on the wheel pair while the packer roller is lifted completely out of the soil.

The parallel coupling also offers the possibility of "self-adjustment", since the amount of hydraulic fluid present in the system can flow between the hydraulic cylinders controlling the packer roller and the hydraulic cylinders controlling the wheel pair. This kind of self-adjustment makes it easier to handle soil irregularities, for example when towing the implement across soil portions that are concave or convex, as viewed from the side.

In use, a soil-working agricultural implement is usually towed in a substantially straight direction across the soil surface that is to be worked. When you arrive at the turn strip, the agricultural implement must be turned. Such a turn can be, for instance, approximately 90° or approximately 180°. Such turns would cause considerable stress on the tools of the agricultural implement and so it is desirable to lift them out of the soil before commencing the turn and then to lower them again once the turn has been completed.

A particular challenge in conjunction with systems connected in parallel is to have the agricultural implement, after the turn, return to the same working depth as before the turn.

SUMMARY OF THE INVENTION

An object is therefore to provide an improved system for adjusting the working depth or height of an agricultural implement.

A particular object is to provide a simple system which enables the agricultural tool to return to a predetermined working depth after it has been lifted up into, for instance, a turning position or a transport position.

The invention is defined by the appended independent claims. Embodiments of the invention will be apparent from the dependent claims and from the following description and the appended drawings.

According to a first aspect, an agricultural implement is provided for working soil across which the agricultural implement travels or is towed, comprising a frame, a first depth maintaining unit, which comprises a first hydraulic actuator for adjusting the height of the first depth maintaining unit relative to the frame, a second depth maintaining unit, which comprises a second hydraulic actuator for adjusting the height of the second depth maintaining unit relative to the frame, at least one soil working tool, and a hydraulic system comprising the hydraulic actuators, which is adapted to be connected to means for supplying hydraulic fluid to the hydraulic system. A first side of the first hydraulic actuator communicates with a first side of the second hydraulic actuator. Measuring means are arranged to provide a measured value corresponding to a first amount of hydraulic fluid occurring on said first sides.

The first sides of the first and second hydraulic actuators can have a common supply line.

By "first side" of a hydraulic actuator is here meant one side of a hydraulic piston or the like.

Regulating means can comprise one or more valves, which can be electrically controlled.

By "communication" is here meant that the fluid of one hydraulic actuator is coupled, directly or indirectly, to the fluid of the second hydraulic actuator.

The hydraulic system has a first side and a second side, where the supply of hydraulic fluid to the first side causes a first movement (for instance extension of the hydraulic cylinders) to occur, and the supply of hydraulic fluid to the second side causes an opposite movement to occur (for instance retraction of the hydraulic cylinders). It will be appreciated that supplying an amount of hydraulic fluid to one side of the system can be equivalent to returning the same amount of hydraulic fluid from the other side of the system.

Thus, by "amount of hydraulic fluid" is meant the amount of fluid that can be supplied to the hydraulic system on one side thereof, said amount corresponding to a measured value that falls within an interval defined by the difference in volume between fully retracted cylinders and fully extended cylinders.

By measuring the amount of hydraulic liquid on one side of the hydraulic system, it is possible to have the agricultural implement return to the same working depth, for example, after a turn, without having to measure the distance to the soil surface.

Furthermore, the agricultural implement can comprise a control unit, which is arranged to control the hydraulic system. This control unit can be arranged to communicate with the measuring means.

Consequently, fully automatic or semi-automatic control can be achieved, which facilitates handling for the user.

The measuring means can comprise at least one sensor, which is adapted to measure a position of one of the hydraulic actuators. The position of the piston in a hydraulic actuator can be used to indicate the amount of hydraulic fluid occurring on one side of the hydraulic actuator.

Alternatively, the measuring means can comprise at least one sensor which is adapted to measure an angle position of an arm associated with one of said depth maintaining units.

Such a sensor measures indirectly the position of the hydraulic actuator and, thus, the amount of hydraulic fluid occurring on one side of the hydraulic actuator.

At least one of the first and second hydraulic actuators can comprise at least two hydraulic cylinders. It may be sufficient for measuring means to be provided adjacent to one of the hydraulic cylinders, especially if the latter are arranged in such a manner that they move substantially the same distance.

According to one embodiment, said at least two hydraulic cylinders can be connected in series.

According to a further embodiment, said at least two hydraulic cylinders can be connected in parallel.

It is conceivable to provide an embodiment with four hydraulic cylinders, one pair of which are connected in series and one pair of which are connected in parallel, and where the two pairs are connected in parallel.

According to one embodiment, said first and second hydraulic actuators can have different length of stroke and/or piston area.

As a result, movements of different magnitude can be achieved.

According to one embodiment, said first and second supporting parts can be located at a substantial distance from each other as seen in a direction of travel of the agricultural implement.

This can be the case in, for example, a cultivator or harrow.

According to another embodiment, said first and second supporting parts can be located at a substantial distance from each other as seen in a transverse direction of the agricultural implement.

This can be the case in, for example, a seeder.

The first and second depth maintaining units can comprise a first and a second supporting part, respectively, for engagement with the soil, which supporting parts can be selected from a group consisting of a wheel, a packer wheel, a rubber roller, a steel roller and a ribbed packer roller.

The soil-cultivating tool can be selected from a group consisting of a cultivating tine, a harrow tine, a levelling implement, a harrow disc, a plough bill, a seed furrow opener, a seed knife, a seed furrow closer, and a sowing disc.

According to a second aspect, a method is provided for controlling the depth level in an agricultural implement as described above. The method comprises receiving, during use of the soil-working tool of the agricultural implement in a working position, a measured value corresponding to a first amount of hydraulic fluid on a first side of the hydraulic system, operating the hydraulic system for lifting the tool into a turning position or a transport position, a second amount of hydraulic fluid occurring in the hydraulic system and, based on the received measured value, restoring the first amount of hydraulic fluid on the first side of the hydraulic system.

BRIEF DESCRIPTION OF THE DRAWINGS

FIGS. 7a-7d show different working conditions for the seeder in FIG. 4.

DESCRIPTION OF EMBODIMENTS

Figure 1:
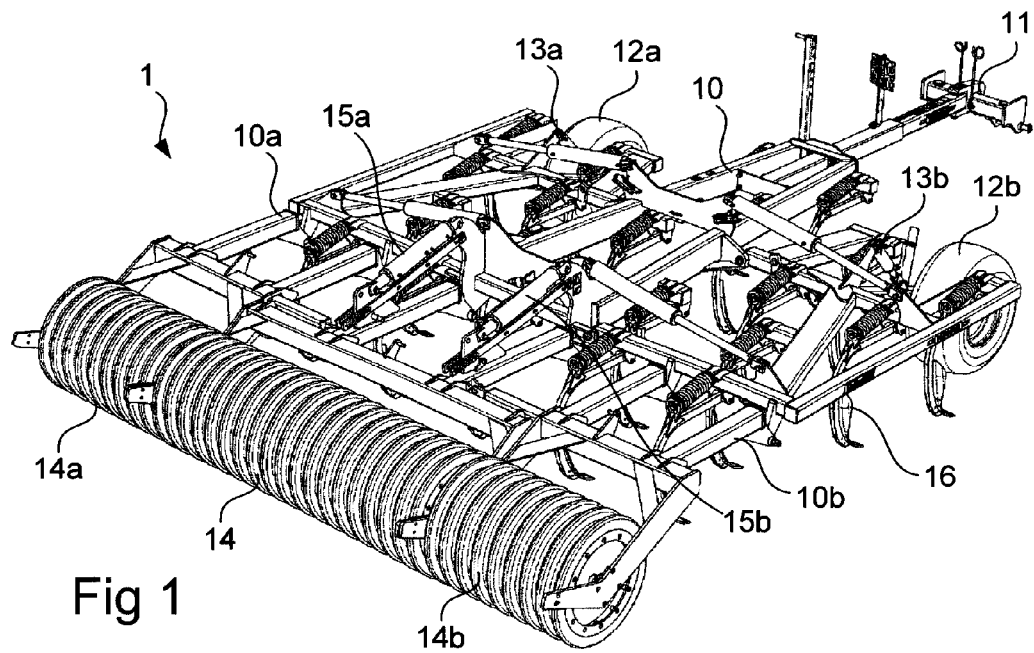
FIG. 1 is a perspective view of a cultivator.

With reference to FIG. 1, an agricultural implement is shown, here in the form of a cultivator 1, which is adapted to be towed behind a towing vehicle 2, such a as tractor, across the soil 3 that is to be cultivated. The cultivator is connected to the tractor by means of a coupling 11, which can be designed with a hitch arrangement (not shown) for coupling it to the towing hook or lifting arms of a towing vehicle (FIG. 1). A cultivator having a hitch arrangement adapted for a towing hook can be provided with a special lifting cylinder for the hitch arrangement.

The cultivator 1 has a frame 10, which can be formed by joining together a plurality of beams and/or pipes of steel. The frame can be formed of a plurality of sections. In the embodiment shown in FIG. 1, the frame has a middle section 10 and two side sections 10a, 10b, which can be adapted to be raised for the purpose of reducing the transport width of the cultivator.

The cultivator 1 has a pair of front supporting wheels 12a, 12b, which are vertically adjustable relative to the frame 10 by means of the respective front hydraulic cylinders 13a, 13b.

The cultivator further has a rear packer roller 14, which is vertically adjustable relative to the frame 10 by means of rear hydraulic cylinders 15a, 15b. The side sections 10a, 10b of the cultivator can be provided with respective packer rollers 14a, 14b, which can be fixedly or movably arranged relative to the respective side section 10a, 10b.

The cultivator also has a plurality of soil-working tools 16, which here are shown in the form of cultivating tines. It will be appreciated that the cultivator can be equipped with a plurality of soil-working tools, which can be of the same type, or of different types, such as cultivating tines, harrow tines, levelling implements, packer rollers, disc tools, etc.

The working depth of the tools 16 can be controlled by actuating the front and rear hydraulic cylinders 13a, 13b; 15a, 15b.

Figure 2:
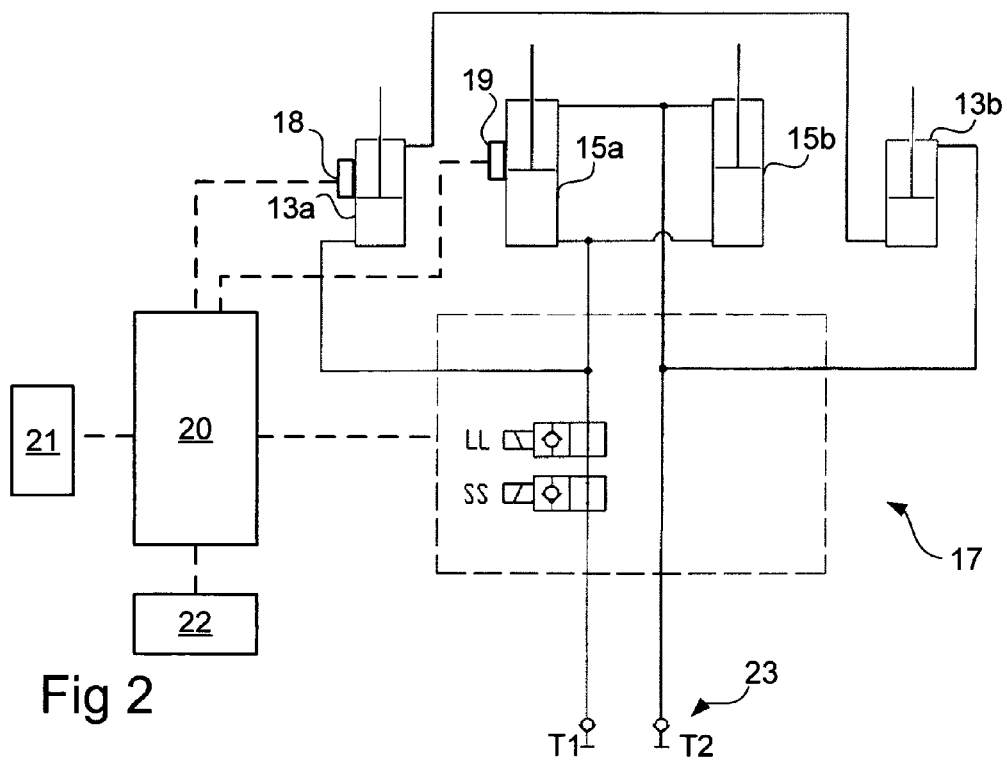
FIG. 2 is a schematic representation of a hydraulic system for the cultivator in FIG. 1.

FIG. 2 is a schematic illustration of a hydraulic system that can be used in the cultivator in FIG. 1.

The hydraulic system comprises the front hydraulic cylinders 13a, 13b, which consist of double-acting hydraulic cylinders, which are connected in series, such that a supply line T1 from a hydraulic system 23 of, for instance, a tractor is connected to a first side of a first one of the front hydraulic cylinders 13a, a second side of the first hydraulic cylinder being connected to a first side of a second hydraulic cylinder 13b, as illustrated in FIG. 2. A second side of the second hydraulic cylinder 13b is connected to a return line T2.

Furthermore, the hydraulic system comprises the rear hydraulic cylinders 15a, 15b, which are connected in parallel, such that the first side of both rear hydraulic cylinders 15a, 15b are connected to the hydraulic system T1 (in parallel to the first front hydraulic cylinder 13a) The second side of the rear hydraulic cylinders 15a, 15b is connected to the return line T2 and to the second side of the second of the front hydraulic cylinders 13b.

By connecting the rear hydraulic cylinders 15a, 15b in parallel, their movement will be synchronized since they are acting between the same two parts, i.e. the machine frame 10 and a frame supporting the packer roller 14.

However, the front hydraulic cylinders 13a, 13b can be connected in series.

In other words, the rear hydraulic cylinders 15a, 15b form a system connected in parallel and the front hydraulic cylinders 13a, 13b form a system connected in series. The two systems are connected in parallel with each other.

A regulating system 17 is arranged to control the flow in the hydraulic lines.

The regulating system 17 comprises a first electric seat valve LL, which is open in a passive state and closable upon actuation, and a second electric seat valve SS, which is open in a passive state and closable upon actuation.

The regulating system 17 is connectable to the hydraulic system 23 of the towing vehicle, which hydraulic system can comprise a pump and a tank (not shown). The hydraulic system can comprise two lines T1 and T2, which both can alternate between the function of a pressure line and a return line, respectively. In normal operation, the connecting valves of the hydraulic system 23 at T1, T2 are closed and no supply to the cultivator occurs. The valve LL is open and the valve SS has been actuated, i.e. it is closed.

The cultivator 1 can be raised by pressurising the line T1 (which is usually done by operating a lever in the tractor), whereupon the valve SS is deactivated, causing it to open. The second line T2 then serves as a return line. Deactivation can occur in response to a sensor signal, which detects, for instance, the position of the hydraulic cylinders. When the cultivator 1 has been sufficiently raised (which can be established based on a sensor signal), the valve LL is activated to prevent further lifting. The cultivator 1 is now in a "low lift" position, i.e. a position in which the tools have been lifted out of the soil. The cultivator is thus held in a raised position by the remaining pressure in its hydraulic system, which is made possible by the connecting valves at T1, T2, which prevent the return of the hydraulic fluid.

The cultivator 1 can be lowered by pressurising the line T2. The line T1 then serves as a return line. When sufficient lowering has been achieved, the valve SS is actuated to prevent further lowering.

A control unit 20 can be arranged to control the regulating system, for example by means of electrically actuated valves (LL, SS), in order to actuate the hydraulic cylinders 13*a*, 13*b*; 15*a*, 15*b* to the desired extent.

Position sensors 18, 19 can be arranged on one (or both) of the front hydraulic cylinders 13*a*, 13*b* and on one (or both) of the rear hydraulic cylinders 15*a*, 15*b*. The position sensors can be arranged to provide a signal corresponding to the position of the piston of the respective hydraulic cylinder 13*a*, 13*b*; 15*a*, 15*b*.

The position sensors can be in the form of linear position sensors, which measure the position of the respective piston in the hydraulic cylinder.

Alternatively, angle sensors can be arranged adjacent to any of the joints about which rotation occurs when raising or lowering the cultivator. As a third alternative, it is conceivable to measure the flow in the hydraulic lines T1, T2 as a function of time and, based thereon, to determine the amount of hydraulic fluid that has been supplied or removed. Such an alternative may require resetting (at an extreme position) at regular intervals or even for every cycle in order to ensure accuracy.

It is also possible to have the control unit 20 influence the hydraulic system 23 of the tractor (not shown).

The control unit 20 is arranged to receive the signal from the position sensors 18, 19. Furthermore, the control unit can have a user interface in the form of a presentation device 21 (screen, display, diode stack or the like) and an input device 22 (keypad, keyboard or the like). These can be integrated in the form of, for instance, a touch screen.

FIGS. 3*a*-3*d* illustrate the functioning of a cultivator 1 comprising a hydraulic system according to FIG. 2.

Figure 3A:
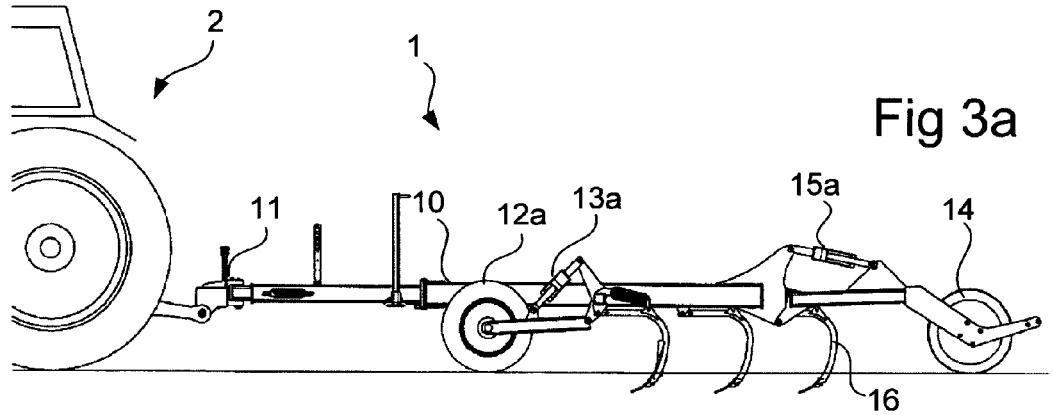
FIGS. 3a-3d show different working conditions for the cultivator in FIG. 1.

In FIG. 3*a*, the cultivator 1 is located on flat ground and adapted to be towed behind a tractor. The front wheels 12*a*, 12*b* and the rear packer roller 14 determine the working depth of the tools 16.

Figure 3B:
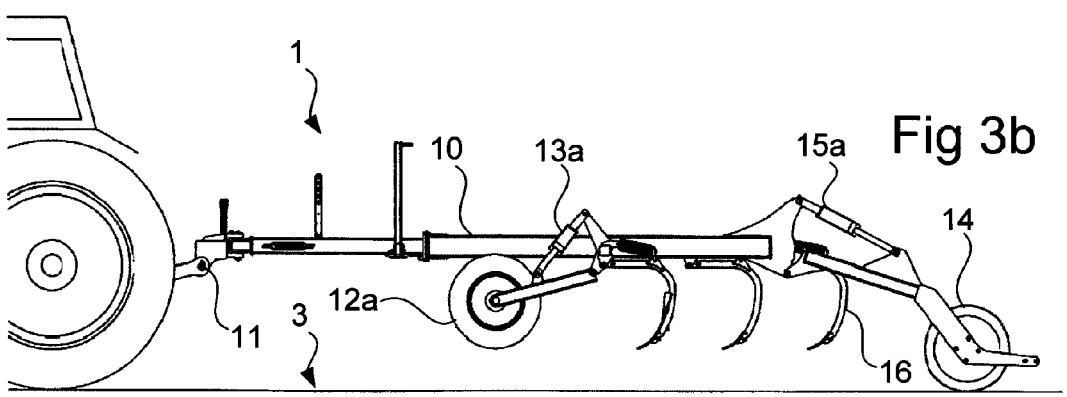

In FIG. 3*b*, the cultivator is shown in a transport position, which may also be a so-called turning position, i.e. a position in which the tools 16 are lifted out of the soil to prevent them from being damaged by the lateral forces that are produced when turning the tractor and agricultural implement around. In this position, only the packer roller 14 is in contact with the soil 3. In a transport position, it is usually desirable to lift the tools 16 higher from the ground 3 than in a turning position. There is no need to actuate the valve LL when lifting to a transport position. In the transport position, one or more special transport latches (not shown) can be activated.

The turning position is achieved by a predetermined amount of hydraulic fluid being supplied to one side of all the hydraulic cylinders 13*a*, 13*b*: 15*a*, 15*b*. As the rear cylinders 15*a*, 15*b* can have a considerably greater length of stroke (and other levers) than the front ones 13*a*, 13*b*, it is possible that the packer roller 14 may achieve a greater height difference relative to the soil 3 than what the wheels 12*a*, 12*b* can achieve. As a result, the cultivator 1 is raised to such an extent that the tools 16 as well as the wheels 12*a*, 12*b* lose contact with the soil 3, which facilitates the turning operation.

Raising of the cultivator 1 according to the above can occur at the same time as the lifting arms of the towing vehicle are being raised or, if a towing hook coupling is utilized, at the same time as a lifting cylinder provided for the hitch arrangement and arranged on the cultivator is being actuated.

Figure 3C:
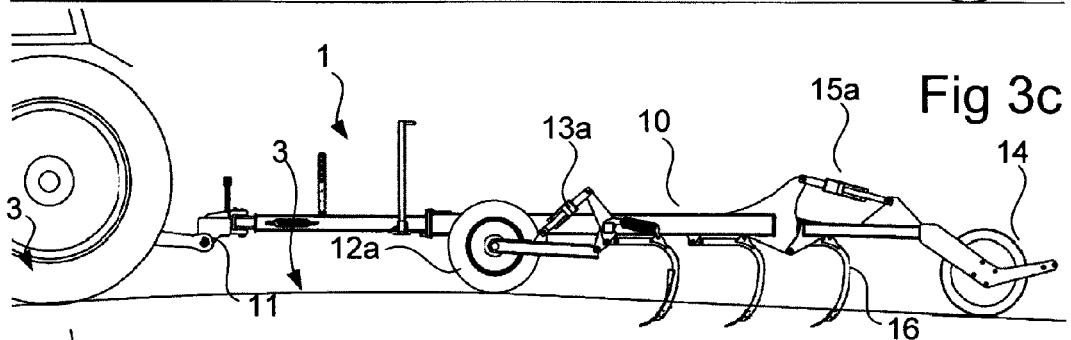

FIG. 3*c* shows the cultivator 1 in a working position on a convex soil portion. Due to the shape of the soil portion, and the direction of the tractive force exerted by the tractor, the front hydraulic cylinders 13*a*, 13*b* will be compressed while the rear hydraulic cylinders 15*a*, 15*b* will be extended. This is a result of the fact that the total amount of hydraulic fluid on the respective side of the hydraulic cylinders is kept constant, as there is no supply of fluid from, or return of fluid to, the tractor, while at the same time the coupling 11 is forced slightly downwards relative to the frame of the cultivator 1, which produces a greater force on the wheels and, consequently, on the front hydraulic cylinders 13*a*, 13*b*, which are thus compressed, forcing hydraulic fluid to be transferred to the rear cylinders 15*a*, 15*b*.

Figure 3D:
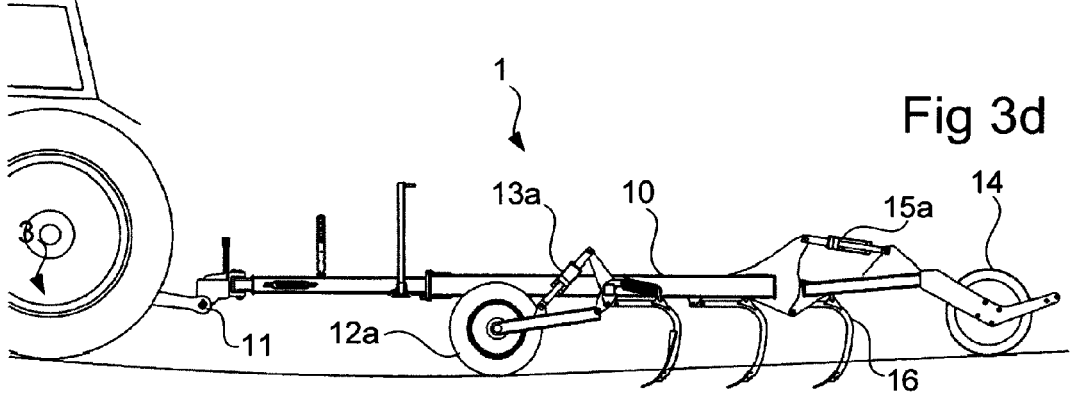

FIG. 3*d* shows the cultivator 1 in a working position on a concave soil portion. In this position, the front hydraulic cylinders 13*a*, 13*b* are more extended and the rear hydraulic cylinders 15*a*, 15*b* are more retracted. This is a result of the fact that the total amount of hydraulic fluid on the respective side of the hydraulic cylinders is kept constant, as there is no supply of fluid from, or return of fluid to, the tractor, while at the same time the coupling 11 is situated slightly higher from the soil surface than when driving on flat ground (FIG. 3*a*), which produces a smaller force on the front hydraulic cylinders 13*a*, 13*b*, and a larger force on the packer and, consequently, on the rear cylinders 15*a*, 15*b*, so that hydraulic fluid is transferred to the front cylinders 13*a*, 13*b*.

The functioning of the cultivator 1 will now be described below.

Before or during normal driving (FIG. 3*a*) along a substantially straight line, the working depth of the cultivator 1 is set by adjusting the amount of hydraulic fluid that is supplied to a first side of the hydraulic system comprising the front and rear hydraulic cylinders 13*a*, 13*b*; 15*a*, 15*b* until the desired working depth has been obtained. The valve LL is then left open and the valve SS is actuated, i.e. it is closed.

From the position sensors 18, 19 the control unit 20 receives signals corresponding to the respective position of the hydraulic cylinders 13*a*, 13*b*; 15*a*, 15*b*, and based on information about the area and length of stroke of each hydraulic cylinder, the amount of hydraulic fluid on one side of the system is calculated. Based on the measured amount of hydraulic fluid occurring on the first (or second) side of the hydraulic system, a value can be presented to the user on the presentation device 21, said value corresponding to the average working depth of the tools. In one embodiment, this presentation occurs by a degree of filling of one side of the hydraulic system being presented as a proportion of the maximum degree of filling, for example in the form of a percentage of the maximal working depth, since it is difficult to correlate the degree of filling of the hydraulic system to a specific working depth. This is because it is generally difficult to measure with sufficient accuracy the absolute working depth due to the unevenness of the soil surface 3, the wear of the tools and the fact that both wheels and packer will sink slightly into the soil.

A value or a signal corresponding to the amount of hydraulic fluid or the working depth can also be stored in a memory in the control unit 20.

When it is time to perform a turning operation, for example when the tractor and agricultural implement arrive at the turn strip, the line T1 is pressurised from the towing vehicle at the same time as the valve SS is opened and the valve LL is kept open, so that the cultivator 1 is raised (FIG. 3b) sufficiently for the tools to be lifted out of the soil. When sufficient lifting height has been achieved, the valve LL is actuated and closed to prevent further raising.

Once the turn has been completed, the line T2 is pressurised and the valve SS is kept open, causing the hydraulic cylinders 13a, 13b; 15a, 15b to be retracted, until the amount occurring before the turn is returned. The valve LL is deactivated and opens during the lowering. When the working depth has been reached, the valve SS is closed and normal driving is then resumed.

According to one embodiment, the control unit 20 can be arranged (programmed or coded into the hardware) to store, in response to an input from the user, a value representing the amount of hydraulic fluid, for example by the user indicating via the input unit 22 that a certain position is to be considered the desired working position, said position corresponding to a first amount of hydraulic fluid on one side of the system. In addition, the control unit can have a pre-programmed turning position, corresponding to a second amount of hydraulic fluid on that side of the system. Upon reaching the turn strip, the user can indicate this to the control unit 20, for example by means of the input unit 22, whereupon the control unit automatically adjusts the height to the turning position by actuating the hydraulic system of the towing vehicle 23 (.i.e. pressurising the lines T1, T2) and the valves LL, SS to the extent that this is required.

Once the turning has been completed, the user can indicate via the input unit 22 that it is time to return to the working position, whereupon the control unit automatically actuates the hydraulic system 23 of the towing vehicle and the valves LL, SS and, thus, sets the system so that the first amount of hydraulic fluid occurs on the first side of the system.

Figure 4:
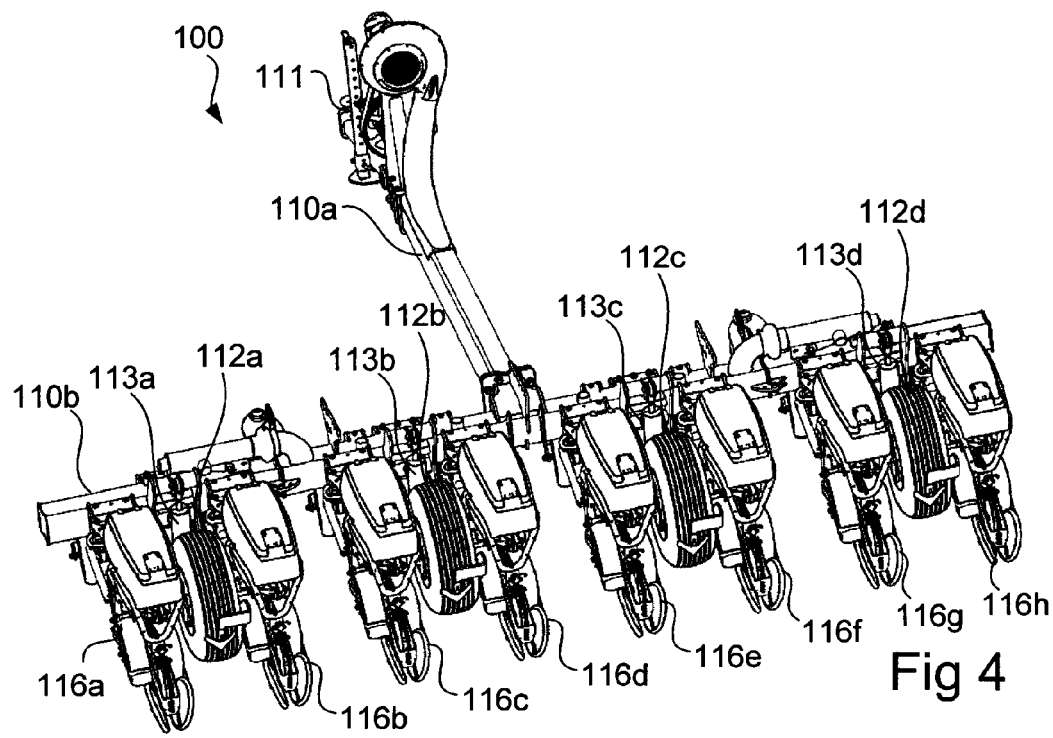
FIG. 4 is a perspective view of a seeder.
Figure 5:
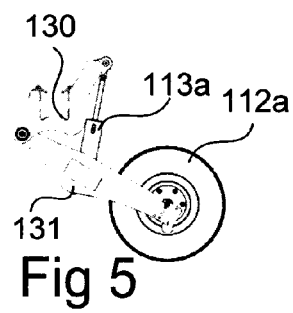
FIG. 5 is a plan view of a wheel of the seeder in FIG. 4.
Figure 6:
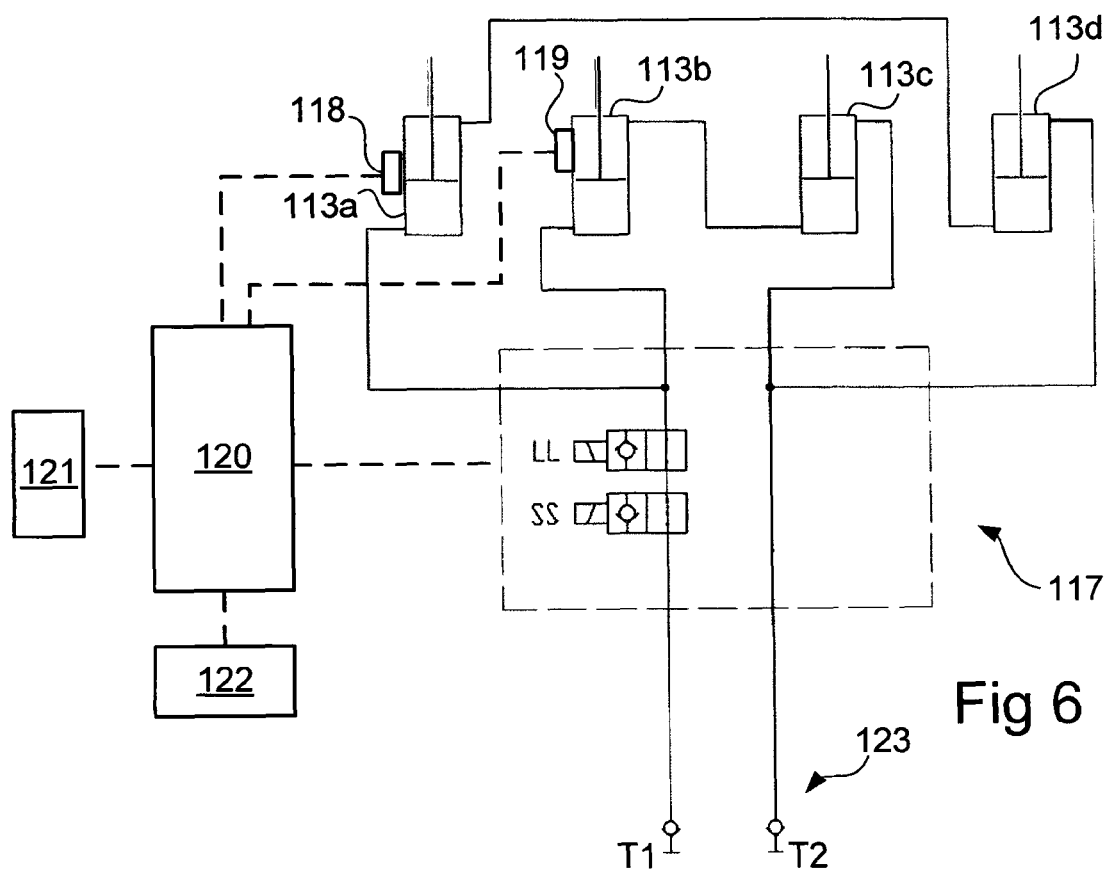
FIG. 6 is a schematic representation of a hydraulic system for the seeder in FIG. 4.

With reference to FIGS. 4-6 a seeder will now be described, in which a similar hydraulic system can be used.

FIG. 4 is a perspective view of a so-called precision seeder 100, which has eight row units 116a-116h, which are arranged along a transverse beam 110b, which forms part of the frame 110a, 110b of the precision seeder.

The precision seeder has a hitch arrangement 111 for towing vehicles, which can be designed in a similar manner as the hitch arrangement for the cultivator 1 described above.

The row units 116a-116h can consist of sowing assemblies, which each can comprise a seed hopper, a seed feeding device, a seed furrow opener, a pressure wheel and a seed furrow closer. It will be appreciated that the row units can be other types of sowing devices than the ones used for precision sowing, and/or other types of soil-working tools.

Four wheel units 112a-112d (FIG. 5) are arranged along the transverse beam 110. Each of the wheel units comprises one or more wheels, which are adapted to serve as support for the seeder 100 when in operation. Each wheel unit can comprise a mounting part 130 and an arm 131. Each wheel unit further comprises a hydraulic cylinder 113a-113d, which acts between the mounting part 130 and the arm 131 and is adapted to adjust the vertical distance between the wheel and the transverse beam 110b, and so to control or limit the working depth of the row units 116a-116h.

Analogously with that which is shown in FIG. 2, a hydraulic system for actuating the hydraulic cylinders 113a-113d can be connected to a hydraulic system 123 of the towing vehicle. The hydraulic system 123 can be identical to the one described with reference to FIG. 2.

Furthermore, the hydraulic system can comprise a pair of double-acting outer hydraulic cylinders 113a, 113d connected in series and a pair of double-acting inner hydraulic cylinders 113b, 113c connected in series.

With respect to the outer hydraulic cylinders 113a, 113d, a first line T1 from the hydraulic system 123 of the towing vehicle can be connected to a first side of the first outer hydraulic cylinder 113a, and to a first side of the first inner hydraulic cylinder 113b. A second side of the first outer hydraulic cylinder 113a can be connected to a first side of the second outer hydraulic cylinder 113d.

A second line T2 from the hydraulic system 123 can be connected to a second side of the second outer hydraulic cylinder 113d and to the second inner hydraulic cylinder 113c. A second side of the first outer hydraulic cylinder 113b can be connected to a first side of the second inner hydraulic cylinder 113c.

Thus, the two pairs of series connected hydraulic cylinders 113a, 113d; 113b, 113c can be connected in parallel, so that one and the same supply line supplies a first side of a hydraulic cylinder of each couple and one and the same return line receives hydraulic fluid from both pairs.

Furthermore, one of the outer hydraulic cylinders 113a and one of the inner hydraulic cylinders 113b can be provided with associated position sensors 118, 119.

The position sensors 118, 119 are connected to a control unit 120 (analogously with the control unit described above), which may also comprise a presentation device 121 and an input device 122 and which may be adapted to control the hydraulic system.

FIG. 7a shows the seeder 100 from behind, when located on flat ground. In this position, all the wheels 112a-112d are located at the same distance from the transverse beam 110b.

FIG. 7b shows the seeder 100 in a state where the two middle wheels run in a pair of grooves 4 made by the towing vehicle.

In this case, owing to the design of the hydraulic system the amount of hydraulic fluid will be distributed between the cylinders 113a-113d in such a manner that each wheel is in contact with the soil surface 3 and the load is evenly distributed over the wheels. This reduces the risk of an unevenly distributed load affecting any one of the wheels. It also reduces the stress on the frame. In this state, the two inner hydraulic cylinders 113b, 113c will receive a greater amount of hydraulic fluid than the two outer hydraulic cylinders 113a, 113d. However, the amount of hydraulic fluid on the respective side of the system is constant, which means that the average working height of the frame is kept constant.

FIG. 7c shows the seeder in a state as it passes over a convex soil surface 3, which causes the two outer hydraulic cylinders 113a, 113d to receive more hydraulic fluid than the two inner hydraulic cylinders 113b, 113c.

FIG. 7c shows the seeder in a state as it passes over a concave soil surface 3, which causes the two inner hydraulic cylinders 113b, 113c to receive more hydraulic fluid than the two outer hydraulic cylinders 113a, 113d.

By adjusting the amount of hydraulic fluid on one side of the system, the working depth of the row units 116a-116h can be controlled or limited. In addition, it relieves the pressure on the row units 116a-116h.

Analogously with that which has been described with reference to the cultivator 1, the amount of hydraulic fluid on the respective side can be used to indicate the height of the frame of the seeder 100 above the ground, which means that it is possible to return to the same height after having completed a turn during which the row units 116a-116h are lifted out of their engagement with the soil surface 3.

The above description relates to a system in which the hydraulic fluid can be transferred between longitudinally spaced-apart hydraulic cylinders and a system in which the hydraulic fluid can be transferred between laterally spaced-apart hydraulic cylinders.

It will be appreciated that the above systems can be combined.

It will further be appreciated that the concept described above can be implemented in an agricultural implement adapted for circulating hydraulic fluid, a so-called Load Sensing system (LS system), since it is possible, also in a system of this kind, to estimate the amount of hydraulic fluid that occurs on one side of the system by measuring the positions of the hydraulic cylinders.

The invention claimed is:

1. An agricultural implement for working soil across which the agricultural implement travels or is towed, comprising:
   a frame;
   a first depth maintaining unit, comprising a pair of first hydraulic actuators to adjust a height of the first depth maintaining unit relative to the frame;
   a second depth maintaining unit, comprising a pair of second hydraulic actuators to adjust the height of the second depth maintaining unit relative to the frame;
   at least one soil-working tool; and
   a hydraulic system comprising the first and second hydraulic actuators, which is connectable to valves configured to supply hydraulic fluid to the hydraulic system;
   wherein
   first sides of the first hydraulic actuators communicates with first sides of the second hydraulic actuators;
   second sides of the first hydraulic actuators communicates with second sides of the second hydraulic actuators; and
   wherein at least one sensor is configured to provide a measured value corresponding to a first amount of hydraulic fluid occurring on said first sides or on said second sides.

2. An agricultural implement according to claim 1, wherein said first sides of said first and second hydraulic actuators have a common supply line.

3. An agricultural implement according to claim 1, further comprising a control unit configured to control said hydraulic system, the control unit configured to communicate with said at least one sensor.

4. An agricultural implement according to claim 1, wherein said at least one sensor is configured to measure a position of one of the hydraulic actuators.

5. An agricultural implement according to claim 1, wherein said at least one sensor is configured to measure an angle position of an arm associated with one of said depth maintaining units.

6. An agricultural implement according to claim 1, wherein at least one of said first and second hydraulic actuators comprises at least two hydraulic cylinders.

7. An agricultural implement according to claim 6, wherein said at least two hydraulic cylinders are connected in series.

8. An agricultural implement according to claim 6, wherein said at least two hydraulic cylinders are connected in parallel.

9. An agricultural implement according to claim 1, wherein said first and second hydraulic actuators have different length of stroke and/or piston area.

10. An agricultural implement according to claim 1, wherein said first and second depth maintaining units are located at a distance from each other as seen in a direction of travel of the agricultural implement.

11. An agricultural implement according to claim 1, wherein said first and second depth maintaining units are located at a distance from each other as seen in a transverse direction of the agricultural implement.

12. An agricultural implement according to claim 1, wherein said first and second depth maintaining units comprise a first and a second supporting part, respectively, for engagement with the soil, which supporting parts are selected from a group consisting of a wheel, a packer wheel, a rubber roller, a steel roller, and a ribbed packer roller.

13. An agricultural implement according to claim 1, wherein said soil-working tool is selected from a group consisting of a cultivating tine, a harrow tine, a levelling implement, a harrow disc, a plough bill, a seed furrow opener, a seed knife, a seed furrow closer, and a sowing disc.

14. A method of controlling the depth level in conjunction with an agricultural implement according to claim 1, comprising:
   receiving, during use of the soil-working tool of the agricultural implement in a working position, a measured value corresponding to a first amount of hydraulic fluid on a first side of the hydraulic system;
   operating the hydraulic system for lifting of the tool to a turning position or a transport position, a second amount of hydraulic fluid occurring on said first side of the hydraulic system; and
   based on the received measured value, restoring the first amount of hydraulic fluid on said first side of the hydraulic system.

* * * * *